June 14, 1960 V. D. ELARDE 2,940,161

METHODS OF MAKING ENCAPSULATED ELECTRICAL DEVICES

Filed Oct. 11, 1955

INVENTOR.
V. D. ELARDE
BY
C. B. Hamilton
ATTORNEY 2,940,161
Patented June 14, 1960

2,940,161

METHODS OF MAKING ENCAPSULATED ELECTRICAL DEVICES

Vito D. Elarde, Schiller Park, Ill., assignor to Western Electric Company, Incorporated, New York, N.Y., a corporation of New York Filed Oct. 11, 1955, Ser. No. 539,750
8 Claims. (Cl. 29—155.5)

This invention relates to methods of making encapsulated electrical devices, and more particularly to methods of making encapsulated capacitors.

In the manufacture of capacitors having cores of wound metallized paper encapsulated in a plastic compound, it is necessary to keep the temperatures of the encapsulating compounds sufficiently low so as to prevent flashing off of the thin layers of metal on the paper strips forming the capacitor core, and it is also necessary to completely seal the leads to the encapsulating compound, and it has been difficult to successfully join sealing compounds to both the metallic leads and the encapsulating compound.

An object of the invention is to provide new and improved methods of making encapsulated electrical devices.

Another object of the invention is to provide methods of making encapsulated capacitors.

A method illustrating certain features of the invention may include forming beads of a high curing temperature epoxy resin on leads and forming beads of a low curing temperature polyester resin around the first-mentioned beads. The leads are then connected electrically and mechanically to a temperature sensitive core, and an impervious cover of the low curing temperature polyester resin is applied to the core and the leads.

A complete understanding of the invention may be obtained from the following detailed description of specific examples of methods of making encapsulated electrical devices, when read in conjunction with the appended drawings, in which Fig. 1 is an exploded perspective view of portions of an electrical device forming one embodiment of the invention partly in section;

Figures 1, 2:
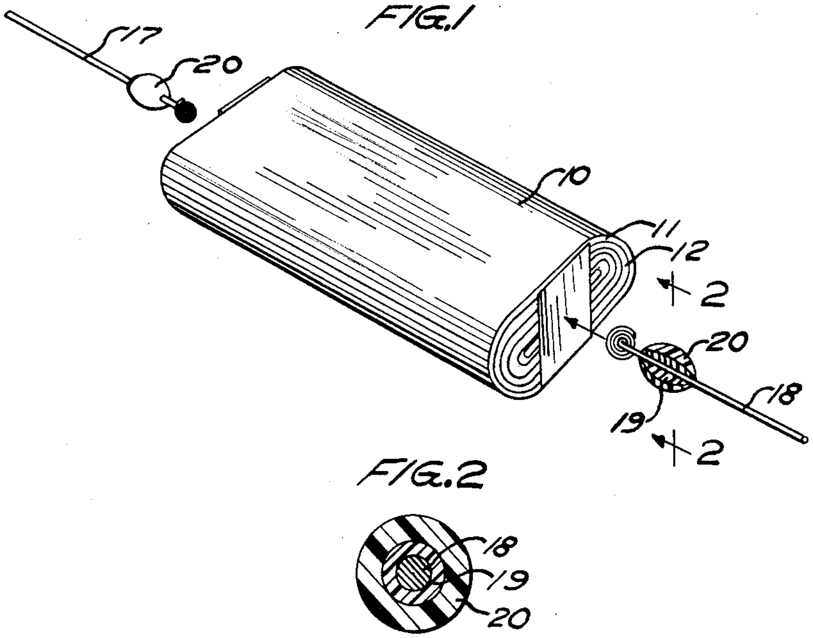
Fig. 2 is an enlarged sectional view taken along line 2—2 of Fig. 1.
Figure 3:
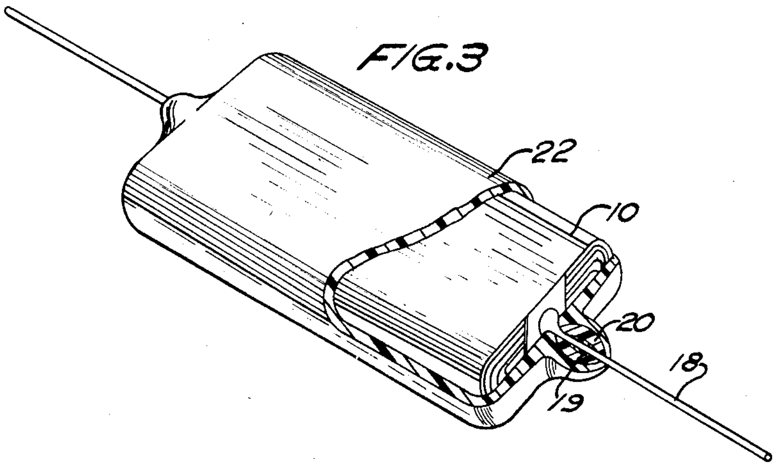
Fig. 3 is a perspective view of the device shown in Fig. 1 with portions thereof broken away.

Referring now in detail to the drawings, there is shown therein a capacitor including a core 10 composed of wound dielectric strips 11 and 12 having metallized inner faces forming the capacitor plates, the metallized faces being subject to severe damage by temperature above 300° F. Terminal leads 17 and 18 composed of bronze, tinned metal, copper or the like, have beads 19 applied thereto and bonded thereto. The beads 19 are composed of a sealing compound highly adhesive to the leads and casting compounds, and highly impervious to moisture and gas. The epoxide type of resins, epoxy resins, are highly satisfactory for the sealing compound. In the following examples, all percentages given are by weight. Highly satisfactory examples of epoxy resins for this purpose are compounds formed by reacting in an alkaline solution of 45% to 70% bivalent phenol, such as, for example, hydroquinone, resorcin, bisphenol or a condensation product of one of these compounds with aryl-, aliphatic-, arylaliphatic- or cyclo-ketones, with 20% to 43% epochlorohydrin or one of its derivatives, with removal of water by vacuum distillation. 0% to 10% of a suitable thinner is added, and polymerization or curing of these compounds is accomplished by the addition of from 3% to 25% of an amine such as, for example, ethylene diamine, metaphenylene diamine, piperidine, trimethylene diamine or guanidine. The class of resins known as epoxies are in general prepared by heating together a bivalent phenol with epichlorhydrin. This reaction is carried out in an alkaline medium to absorb the hydrochloric acid produced during the combination. After the reaction is completed the polyether formed is washed with water, to remove traces of salt, and the water not mechanically separable is removed by vacuum distillation. The polyether is then thinned to the desired working viscosity and is ready to be polymerized by the addition of an amine. The resin should be composed of diphenol from 45% to 70%, epichlorohydrin from 20% to 43%, a thinner from 0% to 10% and an amine from 3% to 20%. For use as a sealant on wires in the encapsulation of electrical components, the epoxy resin used should have the following characteristics in the cured state:

| | | |
|---|---|---|
| Modulus of rupture (ASTM D 790) | p.s.i. | $10\text{–}15 \times 10^3$ |
| Modulus of elasticity (ASTM D 790) | p.s.i. | $3\text{–}6 \times 10^5$ |
| Hardness (Barcol) | | 30–50 |
| Shrinkage during cure | percent | Below 4 |
| Heat distortion temperature | ° F. | Above 150 |

Epoxy resins suitable for forming the beads 19 are:

*Example 1*

| | Percent |
|---|---|
| Bisphenol A | 63 |
| Epichlorhydrin | 26 |
| Thinner | 5 |
| Metaphenylene diamine | 6 |

*Example 2*

| | |
|---|---|
| Hydroquinone | 50 |
| Epichlorhydrin | 42 |
| Thinner | 3 |
| Ethylene diamine | 5 |

*Example 3*

| | |
|---|---|
| Resorcinol | 48 |
| Epichlorhydrin | 40 |
| Thinner | 8 |
| Piperidine | 4 |

The epoxy sealing compound is capable of bonding under low temperature to a polyester casting compound which forms beads 20 and an encapsulating cover 22, the casting compound being curable at temperatures under 300° F. Suitable casting compounds for this purpose are high molecular weight polyesters formed by the interaction of a dibasic acid from 30% to 65%, by weight, such as, for example, maleic, fumaric, succinic, malonic, adipic and phthalic acid, with a polyhydric alcohol from 15% to 35%, by weight, such as, for example, ethylene glycol, propylene glycol and glycerol. The final polymerization of the polyesters to form the beads 20 and the cover 22 is effected by heating after adding a cross-linking agent, such as a styrene monomer in quantities of a small amount such as 5% or 10% to about 40% by weight, and an organic peroxide polymerization catalyst, such as, for example, benzoyl peroxide, tertiary butyl hydroperoxide, methylethylketone peroxide, cyclohexanone peroxide and cumene hydroperoxide.

In the preparation of these styrene-polyester resin compounds, the acid and alcohol (glycol) are heated together in a vacuum still to produce a partially polymerized polyester. The vacuum is required to remove the water formed during the reaction. After removal of the water, the ester is thinned to the desired working viscosity by the addition of styrene monomer. It is then ready for use as a casting material by the addition of the organic peroxide as an accelerator of polymerization. Polyester resin compositions for the application mentioned above should have the following physical characteristics in the cured state:

| | |
|---|---|
| Modulus of rupture (ASTM D 790)--p.s.i.-- | 10–15×$10^3$ |
| Modulus of elasticity (ASTM D 790)--p.s.i.-- | 4–7×$10^5$ |
| Hardness (Barcol) | 35–50 |
| Shrinkage during cure --percent by volume-- | Below 8 |
| Heat distortion temperature--°F-- | Above 80 |

Suitable polyester compounds for the beads 20 and the cover 22 are:

*Example 1*

| | Percent |
|---|---|
| Fumaric acid | 43 |
| Ethylene glycol | 24 |
| Styrene monomer | 33 |

*Example 2*

| | |
|---|---|
| Maleic acid | 46 |
| Propylene glycol | 26 |
| Styrene monomer | 28 |

*Example 3*

| | |
|---|---|
| Maleic anhydride | 37 |
| Ethylene glycol | 23 |
| Styrene monomer | 40 |

After the compounds of the beads 19 are applied to the leads in uncured condition, they are placed under high temperatures to cure the sealing compound. The interiors of the inner beads 19 are sealed to the leads as they are cured. Then the beads 20, which are thin films, are applied to the exteriors of the inner beads 19 and are cured to seal the polyester beads 20 to the beads 19. The leads then are soldered to the ends of the core 10 to form electrical and mechanical connections with the metallized portions of the two strips 11 and 12, the lead 17 being connected electrically to the metallized inner face of one of the strips and the other lead 18 being connected electrically to the metallized inner face of the other strip. The core 10 with the leads soldered thereto then is placed in a mold, and the casting compound is poured into the mold and is cured, in which the casting compound of the cover bonds to the beads 20 to form a seal impervious to water, moisture and gas, the curing being accomplished under temperatures below that at which damage to the core would occur, below 300° F. being satisfactory.

By applying the beads 19 of the high curing temperature sealing compound and the encapsulating beads 20 of casting compound to the leads prior to the connection of the leads to the core, which might be damaged by the high curing temperatures of the sealing compound in the beads, the excellent sealing qualities of the sealing compounds are obtained with no adverse effects on the temperature sensitive core. The above-described method may be utilized to form encapsulated articles other than capacitors, and is highly successful wherever the device to be encapsulated is of a nature likely to be damaged by the temperature required to cure the sealing compound or requires a good metal to plastic seal.

In the use of the term "polyester resin" in the specification and claims, it is intended to include only those of the reaction products of compounds formed from dibasic acids, polyhydric alcohols and styrene within the component ranges described hereinabove, and, similarly, in the use of the term "epoxy resin" it is intended to include only the epoxy resins within the component ranges described hereinabove.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of forming encapsulated electrical devices that have cores subject to flashing above a predetermined temperature, which comprises applying a partially uncured epoxy sealing resin around a lead to form a bead, applying a partially uncured polyester resin around the bead to form a bead layer, heat curing the resins at a temperature above said predetermined temperature, joining the lead to an electrical device, enclosing the device and the polyester resin with polyester resin to form a cover, and heat curing the polyester resin of the cover to fuse it to the polyester resin of the layer at a temperature below said predetermined temperature.

2. The method of encapsulating electrical devices having cores subject to heat destruction above a predetermined temperature, which comprises applying an epoxy resin to a lead, applying a polyester resin over the epoxy resin, heat curing the resins to seal the epoxy resin to the lead and the polyester resin at a temperature above said predetermined temperature, soldering the lead to the heat sensitive core, enclosing the electrical device and the polyester resin with polyester resin to form a capsule, and heat curing the polyester resin of the capsule to fuse the latter resin with the first-mentioned polyester resin at a temperature below said predetermined temperature.

3. The method of forming encapsulated electrical devices having cores subject to heat damage above a predetermined temperature, which comprises applying around a lead to form a bead a partially uncured epoxy sealing resin consisting of about 63% bisphenol A, about 26% epichlorohydrin, about 5% thinner and about 6% metaphylene diamine, applying a polyester resin at least partially uncured around the bead to form a bead layer, heat curing the resins at a temperature above said predetermined temperature, joining the lead to an electrical device, enclosing the device and the polyester resin with polyester resin to form a cover, and heat curing at a temperature below said predetermined temperature the polyester resin of the cover to fuse it to the polyester resin of the layer all percentages being by weight.

4. The method of forming encapsulated electrical devices having portions thereof subject to heat damage at temperatures above a predetermined value, which comprises applying around a lead to form a bead a partially uncured epoxy sealing resin consisting of about 50% hydroquinone, about 42% epichlorohydrin, about 3% thinner and about 5% ethylene diamine, applying a polyester resin at least partially uncured around the bead to form a bead layer, heat curing the resins at temperatures above said predetermined value, joining the lead to an electrical device, enclosing the device and the polyester resin with polyester resin to form a cover, and heat curing at temperatures below said predetermined value the polyester resin of the cover to fuse it to the polyester resin of the layer all percentages being by weight.

5. The method of forming encapsulated electrical devices having cores subject to damage upon being subjected to temperatures above a predetermined value which comprises applying around a lead to form a bead a partially uncured epoxy sealing resin consisting of about 48% resorcinol, about 40% epichlorohydrin, about 8% thinner and about 4% piperidine, applying a polyester resin at least partially uncured around the bead to form a bead layer, heat curing the resins at temperatures above said predetermined value, joining the lead to an electrical device, enclosing the device and the polyester resin with polyester resin to form a cover, and heat curing at temperatures below said predetermined value the polyester resin of the cover to fuse it to the polyester resin of the layer all percentages being by weight.

6. The method of forming encapsulated electrical devices having portions thereof subject to heat damage upon subjection to temperatures above a predetermined value, which comprises applying an epoxy sealing resin partially uncured around a lead to form a bead, applying around the bead to form a bead layer a partially uncured polyester resin composed of about 43% fumaric acid, about 24% ethylene glycol and about 33% styrene, heat curing the resins at temperatures above said predetermined value, joining the lead to an electrical device, enclosing the device and the polyester resin with polyester resin of substantially the same composition as that of the polyester resin of the layer to form a cover, and heat curing at temperatures below said predetermined value the polyester resin of the cover to fuse it to the polyester resin of the layer all percentages being by weight.

7. The method of forming encapsulated electrical devices having portions thereof subject to heat damage upon being subjected to temperatures above a predetermined value, which comprises applying around a lead to form a bead a partially uncured epoxy sealing resin, applying around the bead to form a bead layer an at least partially uncured polyester resin consisting of about 46% maleic acid, about 26% propylene glycol and about 28% styrene, heat curing the resins at temperatures above said predetermined value, joining the lead to an electrical device, enclosing the device and the polyester resin with polyester resin of substantially the same composition as that of the polyester resin of the layer to form a cover, and heat curing at temperatures below said predetermined value the polyester resin of the cover to fuse it to the polyester resin of the layer all percentages being by weight.

8. The method of forming encapsulated electrical devices having portions thereof subject to damages upon application thereto of temperatures above a predetermined value, which comprises applying an epoxy sealing resin at least partially uncured around a lead to form a bead, applying a partially uncured polyester resin around the bead to form a bead layer, heat curing the resins at temperatures above said predetermined value, joining the lead to an electrical device, enclosing the device and the polyester resin with polyester resin to form a cover, and heat curing at temperatures below said predetermined value the polyester resin of the cover to fuse it to the polyester resin of the layer, said polyester resin being composed of about 37% maleic anhydride, about 23% ethylene glycol and about 40% styrene all percentages being by weight.

References Cited in the file of this patent

UNITED STATES PATENTS

| | | |
|---|---|---|
| 247,084 | Maxim | Sept. 13, 1881 |
| 2,255,313 | Ellis | Sept. 9, 1941 |
| 2,392,311 | Christopher | Jan. 9, 1946 |
| 2,500,600 | Bradley | Mar. 14, 1950 |
| 2,559,141 | Williams | July 3, 1951 |
| 2,577,005 | Giacomo | Dec. 4, 1951 |
| 2,674,646 | Schoch | Apr. 6, 1954 |
| 2,706,742 | Ehlers | Apr. 19, 1955 |
| 2,801,229 | Hoff | July 30, 1957 |
| 2,835,640 | Rolle | May 20, 1958 |
| 2,873,304 | Davidson | Feb. 10, 1959 |

FOREIGN PATENTS

| | | |
|---|---|---|
| 665,787 | Great Britain | Jan. 30, 1952 |

OTHER REFERENCES

"Alloying With Epoxies," Modern Plastics, September 1954, 154, Epoxy (pp. 155–157, 160–161, 240–242).

"Plastic Embedded Circuits," Electronics, June 1950 (pages 66–69).

Service (publication), May 1953, pages 50, 51, 114.

Bakelite (publication), November 1954, pages 12, 13, C–8 Epoxy Resins and Hardeners, Bakelite Co.